United States Patent [19]

Brusa

[11] 4,165,006

[45] Aug. 21, 1979

[54] APPARATUS FOR GROUPING INTO BUNDLES ELONGATED OBJECTS, MORE PARTICULARLY SECTIONS OR FLAT ROLLED ELEMENTS

[76] Inventor: Ugo Brusa, Via Vagna, Domodossola, Italy

[21] Appl. No.: 862,391

[22] Filed: Dec. 20, 1977

[30] Foreign Application Priority Data

Dec. 22, 1976 [IT] Italy ............................... 70062 A/76

[51] Int. Cl.² ........................................... B65G 57/18
[52] U.S. Cl. ..................................... 414/63; 198/403; 414/89
[58] Field of Search ............... 214/6 N, 6 P, 6 H, 6.5, 214/1 QG, 6 F; 198/374, 403, 404

[56] References Cited

U.S. PATENT DOCUMENTS

| | | | |
|---|---|---|---|
| 2,701,650 | 2/1955 | Stevenson | 214/6 P |
| 3,282,566 | 11/1966 | Clarke | 214/6 H |
| 3,429,456 | 2/1969 | Burgler | 214/1 Q |
| 3,430,784 | 3/1969 | Hall | 214/6 H |
| 3,547,279 | 12/1970 | Radomski | 198/403 |
| 3,627,150 | 12/1971 | Kazeef et al. | 214/6 H |

*Primary Examiner*—Francis S. Husar
*Assistant Examiner*—Ross Weaver

[57] ABSTRACT

An apparatus for forming bundles of elongated objects comprises a first member which individually drags the objects, and, after having appropriately oriented said objects, if necessary, about the respective axis, delivers them onto a receiving surface provided in a second member. The distance of said surface from the ground may be varied so as to allow to pile the objects, and the second member itself may be displaced transversally to the dragging direction of the objects, to allow to form adjacent piles of objects. The objects are oriented in such a way that adjacent elements in a pile fit one in the other.

5 Claims, 2 Drawing Figures

APPARATUS FOR GROUPING INTO BUNDLES ELONGATED OBJECTS, MORE PARTICULARLY SECTIONS OR FLAT ROLLED ELEMENTS

The present invention relates to an apparatus for grouping into bundles elongated objects, particularly sections or flat rolled elements.

It is known that in order to convey or store objects like sections or flat rolled elements it is convenient to form bundles in which the sections or rolled elements fit together so as to occupy as little room as possible.

At present this operation is normally carried out in a manual way, and therefore it is long, expensive due to the high labour cost, and always somewhat dangerous for the attending personnel.

Apparatuses for grouping into bundles elongated objects have also already been proposed and realized: yet these apparatuses, to cope with the aforementioned requirements, are very complex and expensive, and the use thereof only compensates the disadvantages inherent in the hand-made operation for installations of very large productive power.

The object of the invention is to provide an apparatus which is able to group into bundles elongated objects, more particularly sections or flat rolled elements, in a relatively simple way, so that the apparatus itself is relatively cheap and may be economically used whatever the productive power of the rolling plant may be.

The apparatus according to the invention is characterized in that it essentially comprises a member able to individually drag the objects to be grouped into a bundle and to suitably orient said objects about their axes while dragging them, and a bundle-forming carriage, able to receive the objects delivered by the dragging member onto a surface whose level above the ground may be regulated to allow to pile the objects, the carriage being movable transversally to the dragging direction of the objects, so as to allow to place them side by side on said surface.

For a better clearness, reference is made to the accompanying drawings, in which.

Figure 1:
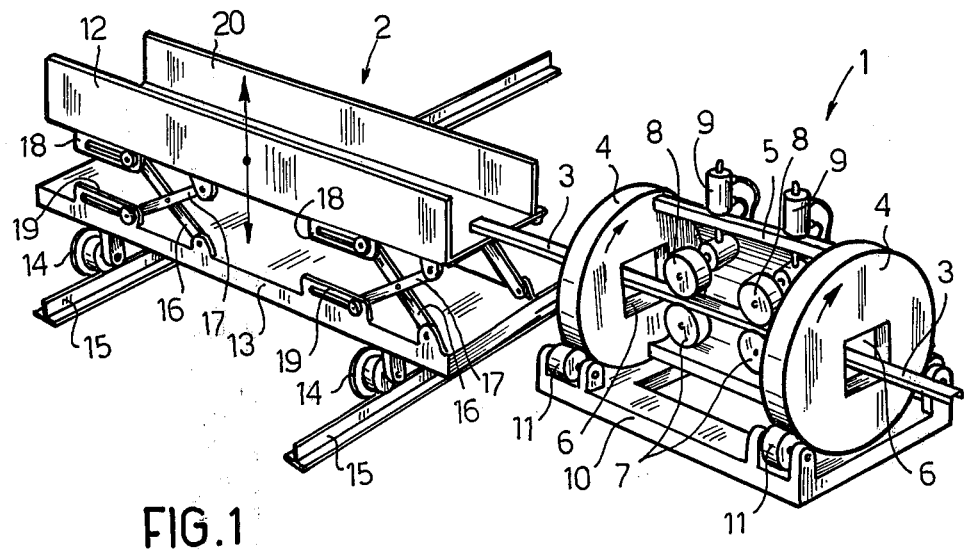
FIG. 1 is a perspective view of the apparatus according to the invention.

As shown in FIG. 1, the apparatus according to the invention essentially comprises two parts, of which the first, generally shown at 1 and hereinafter called "dragging member" is intended to receive elongated objects 3, to orient them, if necessary, about their axis, and to deliver them, with the desired orientation, to a bundle-forming carriage 2, which is the second part of the apparatus. Said objects will be hereinafter denoted, for sake of simplicity, by the term "sections".

Dragging member 1 comprises two parallel and substantially disc-shaped heads 4, connected by a half-cylinder wall 5 of external diameter substantially equal to the head diameter, and provided each with an axial bore 6 allowing sections 3 to pass through and, if necessary, to be rotated about their longitudinal axis.

A first pair of rollers 7, carried by wall 5, acts as a support for the sections while these are moving through the dragging member; a second pair of rollers 8, also rotatable about their axis and having a vertically adjustable position, keeps sections 3 pressed against rollers 7; hydraulic jacks 9 allow to adjust the position of rollers 8. The whole of the described devices is carried by a base 10 which is provided, for instance in correspondence of the corners, with rollers 11 onto which heads 4 of the dragging member abut. Motors, not shown in the drawings, allow the dragging member to rotate about its axis by half a turn in either direction, in order to change the orientation of the sections about the respective axis.

The bundle-forming carriage 2 has a loading body 12 open at both ends; one of the side walls of said body, denoted by 12a, can slide parallel to itself and perpendicularly to the longitudinal axis of the body, to allow the loading surface of the body to be varied.

Body 12 is connected to a base 13, provided with wheels 14 rolling on rails 15 perpendicular to the longitudinal body axis, through pairs of levers 16, 17 pivotally interconnected at their central points and pivotally connected at one end to the base or respectively the body; the other end of said levers is slidably engaged in guides 18, 19 solid with the body 12 or respectively the base 13. In this way the loading plane of the body may be displaced both vertically and transversally to the section axis, in order to allow both a plurality of sections to be piled, and sections piles to be located side by side, as shown in FIG. 2.

For sake of drawing simplicity, the means driving the vertical movements of body 12 and the horizontal movements of carriage 2 have not been shown.

The operation of the device according to the invention will now be described.

Figure 2:
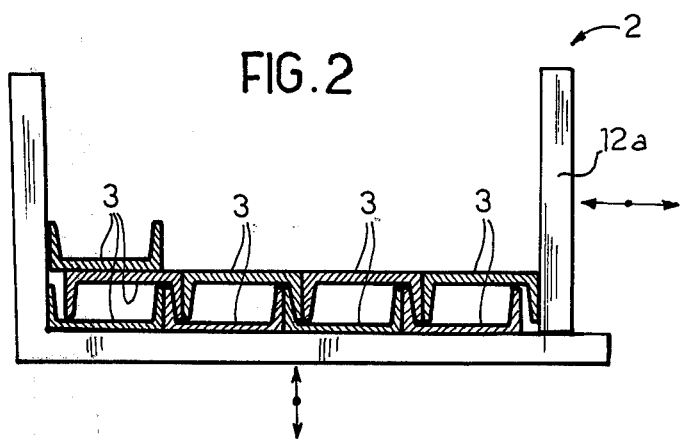
FIG. 2 is a partial, sectional view of the bundle-forming carriage.

In such a description it will be assumed that the elongated objects to be grouped into a bundle are C-shaped sections as shown in FIG. 2, and that they must be arranged as shown in the same FIG. 2, that is in superimposed layers such that the sections of one layer have upward directed concavity, whereas the sections of the next layer have downward directed concavity and fit into the sections of the layer below.

Taking this into account, the sections, which are sequentially delivered to the apparatus by any suitable conveying device, enter dragging member 1 through opening 6 in the head 4 shown at the right in the drawing, and are gripped and moved forward by rollers 7, 8 in such a way that their front ends come out from the dragging member through opening 6 in the other head. If the sections are oriented, with respect to their axis, in the desired way (for instance, the concavity is upward directed) the movement of the section goes on until the section will be completely supported by the loading plane of body 12 of carriage 2. This carriage will have been located on rails 15 in such a position that the first section is placed substantially adjacent to the fixed body wall.

At this moment carriage 2 will be displaced by a distance substantially equal to the width of a section, in order to allow to charge the second section; if this also arrives at the dragging member with the desired orientation, it will be loaded in the same way as hereinbefore described; if on the contrary the section has to be upsetted, dragging member 1 will be rotated by half a turn before the front of the section end arrives in correspondence of the carriage, so that the section takes the desired orientation. The operation is repeated identically for the subsequent sections, the carriage being displaced each time by a certain distance and the dragging member being rotated by half turn whenever this rotation is necessary. Once the first layer of sections has been loaded, body 12 will be slightly lowered, and the described operations will be repeated to fit the sections of the second layer over and into the sections of the first one, as shown in FIG. 2. Also while this layer is loaded the dragging member will be rotated whenever it is necessary to change the orientation of a section with respect to the orientation of the preceding one. Carriage 2 may be moved in the direction opposite to the preceding one to allow to place the sections side by side. At the end of the operations, when the desired number of adjacent and superimposed layers has been reached, carriage 2 will be moved out of the bundle formation zone.

Slight displacements of movable wall 12a of body 12 will allow to suitably arrange the sections, in order to keep them perfectly adjacent and adhering to one another; obviously, by varying the position of the wall with respect to the edge of body 12, it is possible to change the number of adjacent sections in each bundle. The possibility of adjusting the position of rollers 8 allows on the contrary to fit for the different shapes and sizes of the sections, so that these are always positively guided while moving towards carriage 2.

It is self evident that the above description has been given by way of non limitative example, changes and modifications being possible without departing from the scope of the invention.

What we claim is:

1. Apparatus for grouping elongated objects having longitudinal axes, particularly sections or flat rolled elements, into bundles, said apparatus comprising, a dragging member including means to individually drag the objects to be grouped in an axial direction and into a bundle and means to suitably orient said objects by individually rotating them in a controlled and predictable manner about said axes while dragging them in an axial direction, a bundle-forming carriage including means to receive the objects delivered by the dragging member onto a surface of said carriage, means for changing the level of said surface above the ground to allow the objects to be piled and means for moving said carriage transversely to the dragging direction of the objects to allow the objects to be placed side by side on said surface.

2. Apparatus according to claim 1, characterized in that said dragging member comprises: two parallel and disc-shaped heads spaced apart from each other in the direction of the axes of the objects, and connected by a half-cylinder wall of external diameter substantially equal to the head diameter, each said head being provided with an axial bore through which the objects to be grouped into a bundle pass; a first roller pair carried by said wall and serving as a support for said objects while they are being dragged; a second roller pair, also carried by said wall, said second roller pair being arranged to move said objects forward while keeping them pressed against the rollers of the first pair; said dragging member being rotatable about the common axis of the heads and the wall by half a turn, in either direction, in order to vary the orientation of the objects about their axes.

3. Apparatus according to claim 2, characterized in that the position of the rollers of the second pair is vertically adjustable.

4. Apparatus according to claim 1, characterized in that said bundle-forming carriage comprises a body open at both ends, and having a loading plane which forms said surface at an adjustable level, said body further including a pair of spaced apart side walls extending upwardly from said loading plane, said carriage also including a base provided with wheels sliding on rails arranged transversely to the movement direction of the objects to be grouped into a bundle, said body being linked to said base through pairs of levers pivotally interconnected to each other and pivotally connected at one end to the base and the body, respectively, the other ends of said levers being slidably engaged in guides integral with the body and the base, respectively.

5. Apparatus according to claim 4, characterized in that a wall of said body is movable parallel to said rails.

* * * * *